United States Patent Office 2,759,033
Patented Aug. 14, 1956

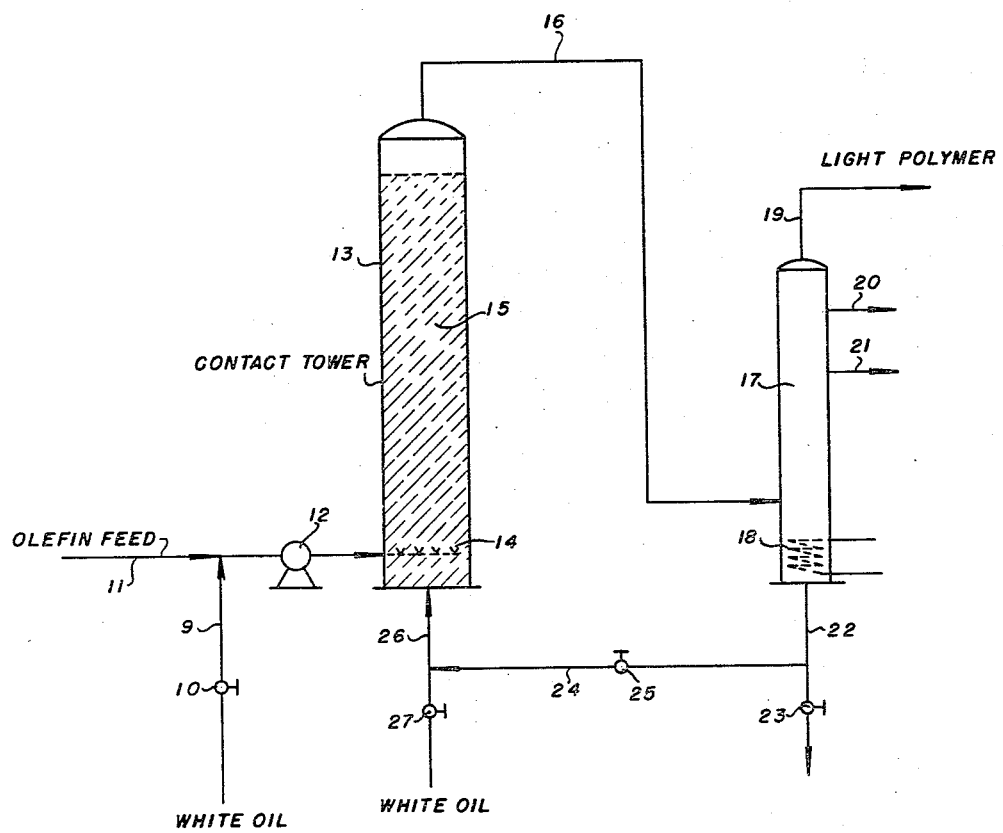

2,759,033

PHOSPHORIC ACID POLYMERIZATION PROCESS

Jean H. Karchmer, Houston, and Sam R. Bethea, Baytown, Tex., assignors, by mesne assignments, to Esso Research and Engineering Company, Elizabeth, N. J., a corporation of Delaware Application March 17, 1952, Serial No. 276,903

2 Claims. (Cl. 260—683.15)

The present invention is directed to a method for polymerizing olefins. More particularly, the invention is directed to a method for polymerizing olefins in which selective polymers are formed.

The present invention may be described as involving the polymerization of an olefin, such as a mono-olefin, having from 2 to 6 carbon atoms in the molecule by contacting a stream containing the olefin with a mixture of a liquid phosphoric acid and a white oil at a temperature in the range between 250° and 500° F. and at a pressure in the range from at least atmospheric to about 1000 pounds per square in. gauge to form a product from which a selective polymer may be recovered.

The white oil employed in the practice of the present invention should be used in the mixture with phosphoric acid in a ratio in the range of phosphoric acid to white oil from 1:0.1 to 1:10.

The white oil is a commercial product known as "Primol D" which is available on the market. The white oil may also be the product such as described by Kalichevsky and Stagner, "Chemical Refining of Petroleum," Rev. Ed., Reinhold Publishing Corp., New York, 1942, page 73. The white oil is also known as "petrolatum liquidum" as described at page 353 of the 12th revision of U. S. P. official from November 1, 1942. The white oil may be manufactured as described in Kalichevsky and Stagner supra or it may be manufactured specifically by employing a raffinate resulting from the phenol extraction of a Coastal lubricating oil distillate. The raffinate may be treated in two or more stages with fuming sulfuric acid (concentrated $H_2SO_4 + 20\%$ $SO_3$). The mixture of oil and acid is allowed to settle or the mixture may be centrifuged to separate, after a preliminary separation of acid sludge, acid soluble sulfonates and excess acids. The oil may then be washed with an alkaline reagent and water and following this treatment the oil is passed through a clay bed, such as a bed of Attapulgus clay, to remove the last traces of color bodies which may remain in the oil. After the last treatment mentioned the oil is water white. It is understood in the practice of our invention that when we use the term "white oil" we mean the white oils of commerce and not exclusively oils such as set out in U. S. P. supra.

The temperature employed in the practice of the present invention may range from about 250° to about 500° F. with a preferred range of temperature from about 350° to 400° F. Pressures employed in the practice of the present invention may range from atmospheric up to about 1000 pounds per square inch gauge with a preferred range from about 300 to 750 pounds per square inch gauge. Increasing the pressure results in increased contact time and increases the yields remarkably.

The olefin-containing feed stock may be employed in either the liquid or the vapor phase and it may contact the liquid phosphoric acid in any suitable mixing device. One way of contacting the olefin with the liquid phosphoric acid catalyst is by forming a pool or column of the liquid phosphoric acid catalyst and allowing the olefin feed to bubble upwardly through the pool or column of liquid catalyst through suitable jets. It is also possible to contact the olefin-containing stream with the liquid phosphoric acid in suitable contact towers such as towers equipped with bell cap trays and other contacting means. It is possible to use conventional contacting equipment such as bell cap trays universally employed in the petroleum industry and resort may be had to inert contacting means such as quartz. It is also within the purview of our invention to employ contacting materials such as carbon Berl saddles, Raschig rings, other ceramic packing, and any of the conventional distribution means employed in the industry, having a low silica content. Glass and other materials containing a high percentage of silica are undesirable as the phosphoric acids react therewith and gradually dissolves them. It is also possible to contact the olefin-containing stream with the liquid phosphoric acid catalyst by resorting to incorporating devices, centrifugal pumps, stirring and other mixing devices available to the art. The only requirement as to the contacting device is that it should allow intimate contact between the liquid catalyst and an olefin-containing stream such that polymerization of the olefin is effected.

The olefins forming the feed stock of the present invention will include the olefins containing from two to about six carbon atoms in the molecule and may be exemplified by ethylene, propylene, the butylenes, pentylenes and hexylenes. Similarly, the diolefins having from four to six carbon atoms may also be employed in the practice of the present invention. Illustrative members of the diolefins that may be used as feed stocks are butadiene, pentadienes, such as isoprene, and the hexadienes. When ethylene forms a portion of the feed stock it should be employed in admixture with another olefin having a greater number of carbon atoms since efforts to polymerize ethylene alone have been largely unsuccessful in that low yields were obtained. It is contemplated that the olefin feed stock of the present invention may be used in the pure state or in admixture with other olefins or other hydrocarbons. For example, propylene is a preferred feed stock and it is usually obtained in the petroleum refinery in admixture with ethylene, propane, and possibly some butylenes and butadiene. Thus, while the pure hydrocarbon will be the preferred feed stock, it is within the spirit and scope of my invention to use mixtures of the various olefins.

The invention will be further illustrated by reference to the drawing which is a flow diagram of a preferred mode of practicing the invention.

Referring now to the drawing, numeral 11 designates a charge line through which an olefin feed, which may be a propylene-containing stream, is admitted from a source not shown. The olefin feed flowing through line 11 has added to it, by line 9, controlled by valve 10, a white oil such as described above in an amount sufficient to provide a ratio of liquid phosphoric acid to white oil in the range from 1:01 to 1:10. Line 11 is provided with a pump 12 which serves to discharge the propylene-white oil-containing stream into a contacting tower 13 through distributors 14. Arranged in a contacting tower 13 is a pool of liquid phosphoric acid 15 generally indicated by the shaded portion. The olefin feed contacts the phosphoric acid, which may be ortho- or pyro-phosphoric acid having a strength in the range from 75% to 110% $H_3PO_4$, by bubbling upwardly through the pool 15. The reacted product leaves the contacting tower 13 through line 16 which discharges the polymerized product into a distillation tower 17. Distillation tower 17 is provided with a heating means illustrated by coil 18 for adjustment of the temperatures and pressures in the tower 17. It will be understood that the distillation tower 17 may be a series of distillation towers and may be provided with suitable internal contacting equipment whereby intimate contact between liquids and vapors is effected. For purposes of this description distillation tower 17 is provided with bell cap trays as are ordinarily employed in the petroleum industry. Distillation tower 17 is provided with line 19 for removal overhead of light polymers, line 20 for removal of polymers of intermediate boiling range and line 21 for removal of heavy polymers. Line 22 serves to allow withdrawal of heavy material, such as any white oil which may be carried over with the product and from which the polymers are separated. This white oil may be discarded from the system by valve 23 in line 22 or may be recycled to contact tower 13 by branch line 24 controlled by valve 25. Line 24 connects into line 26 which contains a valve 27. If the product discharged into tower 17 by line 16 does not contain white oil or if the white oil is discharged from the system by line 22, make-up white oil may be introduced into the system by line 26, controlled by valve 27 but preferably is introduced by line 9 controlled by valve 10.

The polymer withdrawn from tower 17 by lines 19, 20 or 21 may be used in various ways. For example, the light polymer which is selectively formed and which may boil up to 300° F. may be used as an ingredient of aviation fuel after hydrogenation or as a motor fuel without hydrogenation. The light polymer may also be used as an olefin for alkylation. The intermediate and higher boiling polymers may serve as feed stocks for alkylation processes in the production of detergent raw materials.

The present invention produces unusual results in that the presence of white oil in admixture with phosphoric acid allows the polymer product to be composed chiefly of selectively formed polmers, such that polymers boiling below 300° F. are produced in a major amount. Stating this in another way, the polymer produced in accordance with the present invention wherein a white oil is present in admixture with the phosphoric acid contains polymerized olefins which consists predominately of dimers or trimers of the olefinic feed. In other words, the formation of tetramers and higher polymers is suppressed by the presence of white oil in admixture with the phosphoric acid. By varying the amount of white oil in admixture with the phosphoric acid, it is possible to vary the product which is formed. In short, major amounts of white oil in the range given will result in the formation of lighter products while smaller amounts of white oil will produce both light and heavy products. Thus, in our invention it is possible to control the product to form substantially any polymer which is desired.

The present invention will be further illustrated by the following runs in which in one instance a propylene-containing stream was polymerized in the presence of 100% phosphoric acid and in a second instance was polymerized with a mixture of 100% phosphoric acid and white oil in a ratio of phosphoric acid to white oil of 1:4.3. The white oil employed in the run given below had a viscosity of 325 at 100° F. The results of these runs are set out in the following table:

Table

|  | 100% H₃PO₄ | 100% H₃PO₄—white oil (1:4.3 wt. ratio) |
|---|---|---|
| Pressure, p. s. i. g | 300–750 | 300–750 |
| Temperature, °F | 320–360 | 320–360 |
| Total polymer yield, wt. percent | 94.7 | 81.2 |
| Volume percent olefins in product: | | |
| $C_6{=}$ (120–170° F.) | 1.0 | 6.5 |
| $C_7{=}-C_8{=}$ (170–250° F.) | 4.0 | 4.5 |
| $C_9{=}$ (250–300° F.) | 32.0 | 60.0 |
| $C_{10}{=}-C_{11}{=}$ (300–360° F.) | 12.0 | 7.0 |
| $C_{12}{=}$ (360–430° F.) | 37.0 | 19.0 |
| $C_{13}{=}$ (430° F.+) | 14.0 | 3.0 |

From the foregoing run it will be noted that when operating in accordance with our invention the product consisted of 71% of a polymer boiling below 300° F. and containing a major amount of dimers and trimers while, in accordance with the prior art, a major proportion of the product was polymers boiling above 300° F. and containing a major amount of tetramers. Thus in accordance with this run it will be seen that it will be possible to produce dimers and trimers selectively as opposed to the prior art where tetramers were mostly produced.

In the practice of the present invention it may be desirable to vary the strength of the phosphoric acid catalyst and this may be done by adding or removing water from the phosphoric acid which is employed. This is a well known technique and does not form a part of our invention. It will suffice to say that phosphoric acids having a strength ranging from 75 to 110% H₃PO₄ and preferably ranging from 100% to 105% H₃PO₄ may be used.

The nature and objects of the present invention having been completely described and illustrated, what we wish to claim as new and useful and to secure by Letters Patent is:

1. A method for polymerizing olefins to form a polymerized product containing predominantly dimers and trimers which comprises forming an admixture of liquid phosphoric acid having a strength in the range from 100% to 105% H₃PO₄ and white oil in a weight ratio of phosphoric acid to white oil of 1:4.3, contacting a propylene-containing feed with said admixture at a temperature in the range from 250° to 500° F. and at a pressure in the range from atmospheric to 1000 pounds per square inch gauge to form a polymerized product containing a major amount, in excess of 60% by volume, of dimers and trimers of said propylene boiling below 300° F., and recovering said dimers and trimers.

2. A method in accordance with claim 1 in which the phosphoric acid is 100% H₃PO₄, the temperature is in the range from 320° to 360° F. and the pressure is in the range from 300 to 750 pounds per square inch gauge.

References Cited in the file of this patent

UNITED STATES PATENTS

| 2,409,247 | Brooks et al. | Oct. 15, 1946 |
| 2,409,248 | Brooks et al. | Oct. 15, 1946 |
| 2,500,307 | Brooks et al. | Mar. 14, 1950 |
| 2,592,428 | Kemp et al. | Apr. 8, 1952 |